United States Patent
Hylin et al.

(10) Patent No.: US 7,382,334 B1
(45) Date of Patent: *Jun. 3, 2008

(54) DIGITAL INFORMATION SYSTEM

(75) Inventors: Mats Hylin, Danderyd (SE); Mats Dahlgren, Helsingborg (SE); Joakim Jonason, Lidingo (SE)

(73) Assignee: T-Rex Property AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/135,549

(22) Filed: Jul. 18, 1998

Related U.S. Application Data

(63) Continuation-in-part of application No. 08/676,517, filed on Jul. 2, 1996, now Pat. No. 6,005,534.

(60) Provisional application No. 60/017,403, filed on May 14, 1996.

(30) Foreign Application Priority Data

| Apr. 26, 1996 | (SE) | ................................... 9601603 |
| Jan. 29, 1997 | (SE) | ................................ 9722250.5 |
| Apr. 23, 1997 | (SE) | ................................... 9741546 |

(51) Int. Cl.
*G09G 5/00* (2006.01)
*G06Q 10/00* (2006.01)

(52) U.S. Cl. ............................ 345/2.1; 345/2.2; 705/5; 705/6

(58) Field of Classification Search .......... 345/1.1–1.3, 345/2.1–2.3, 3.1; 705/5–14; 701/200, 213; 455/419
See application file for complete search history.

(56) References Cited

U.S. PATENT DOCUMENTS

| 5,099,319 | A | | 3/1992 | Esch et al. |
| 5,109,384 | A | * | 4/1992 | Tseung ........................ 714/748 |
| 5,412,416 | A | | 5/1995 | Nemirofsky |
| 5,448,263 | A | | 9/1995 | Martin |
| 5,499,046 | A | | 3/1996 | Schiller et al. |
| 5,508,713 | A | | 4/1996 | Okouchi |

(Continued)

FOREIGN PATENT DOCUMENTS

AU      A-48849/90      8/1990

(Continued)

OTHER PUBLICATIONS

IBM Digital Media Distributor, IBM brochure, date unknown.

*Primary Examiner*—David L. Lewis
(74) *Attorney, Agent, or Firm*—Pierce Atwood LLP; Kevin M. Farrell; Katherine A. Wrobel

(57) ABSTRACT

The invention relates to a digital information system for displaying information on at least one display means with the aid of at least one television set or camera. The exposures are presented at places accessible to and frequented by a general public. The information system includes external information mediators and information is controlled dynamically through the medium of a communication interface and through the medium of an exposure handler in a central computer. The inventive system also includes a communication interface against an elective number of cinema computers having connected television or camera computers which control television sets or cameras for displaying pictures or exposures. The cinema computers and peripheral equipment are situated at mutually distanced places.

42 Claims, 1 Drawing Sheet

U.S. PATENT DOCUMENTS

| | | |
|---|---|---|
| 5,565,911 A | 10/1996 | Ishikawa et al. |
| 5,568,279 A | 10/1996 | Hinman et al. |
| 5,612,741 A | 3/1997 | Loban et al. |
| 5,634,018 A | 5/1997 | Tanikoshi et al. |
| 5,642,484 A | 6/1997 | Harrison et al. |
| 5,675,637 A | 10/1997 | Szlam et al. |
| 5,745,688 A | 4/1998 | Oka |
| 5,848,397 A | 12/1998 | Marsh |
| 6,006,159 A * | 12/1999 | Schmier et al. ............. 340/988 |
| 6,144,848 A * | 11/2000 | Walsh et al. ................ 455/419 |
| 6,507,949 B1 | 1/2003 | Jonason et al. |

FOREIGN PATENT DOCUMENTS

| | | |
|---|---|---|
| FR | 2634295 | 1/1990 |
| GB | 2 288 474 | 8/1985 |
| GB | 2288474 | 10/1995 |
| JP | 4-016985 A | 1/1992 |
| JP | 5-300563 A | 11/1993 |
| JP | 8-030222 A | 2/1996 |
| WO | WO93/16459 | 8/1993 |
| WO | WO96/08113 | 3/1996 |

* cited by examiner

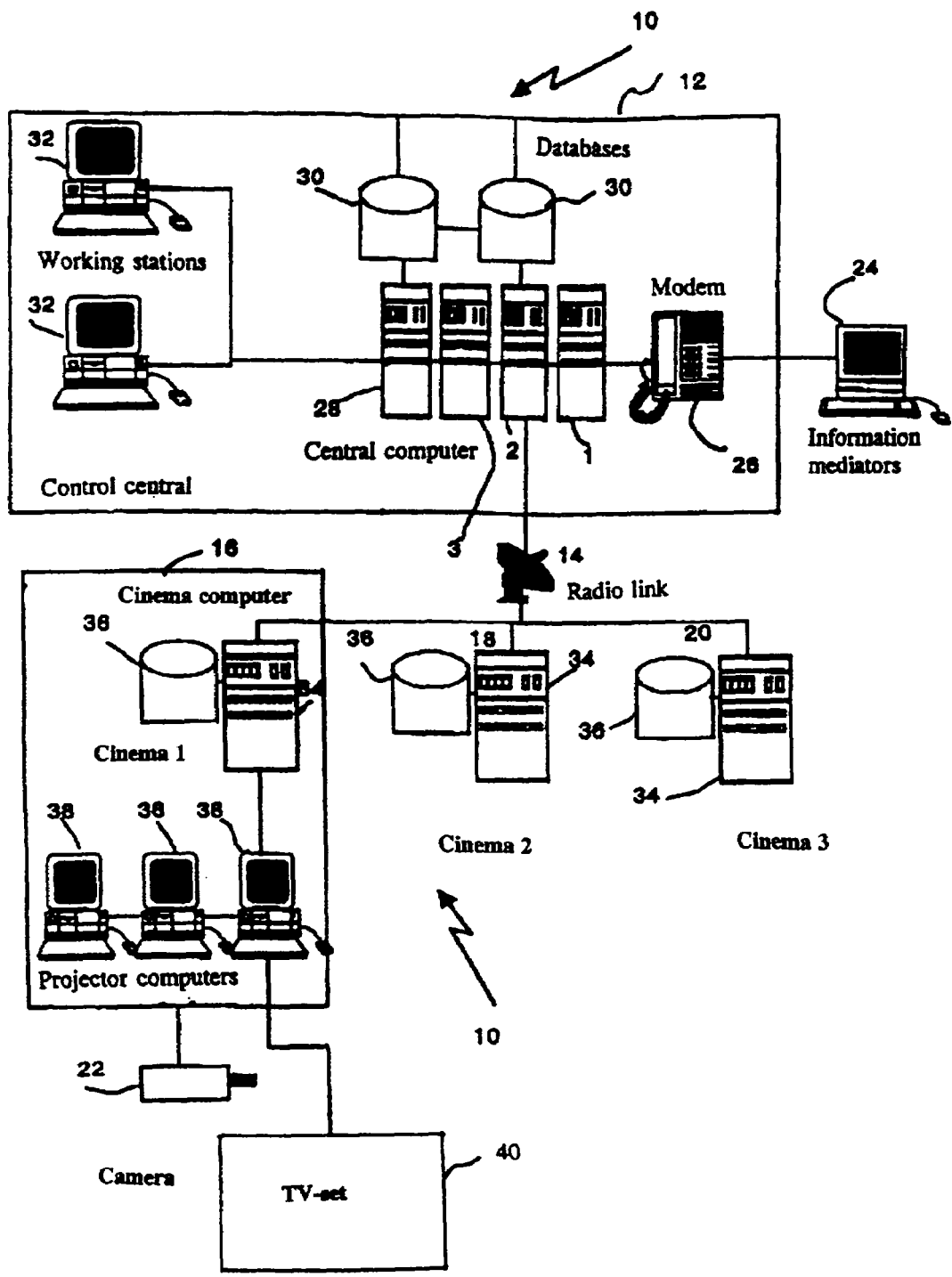

DIGITAL INFORMATION SYSTEM

CROSS-REFERENCE TO RELATED APPLICATIONS

The present application is a continuation-in-part of application Ser. No. 08/676,517, filed on Jul. 2, 1996 now U.S. Pat. No. 6,004,534, the disclosure of which is expressly incorporated by reference herein in its entirety.

TECHNICAL FIELD

The present invention relates to a method and to an arrangement for controlling and coordinating television sets, with peripheral equipment, or cameras, with peripheral equipment, in a digital information system for displaying information on at least one display device through the medium of at least one television set or camera for each said device, said information being displayed in places such as cinemas, private homes, onboard air-crafts, onboard trains, onboard ships, main railway stations, subway stations, airport waiting lounges etc, and generally every were advertisements, films, movies and other information is displayed through the medium of television sets or cameras.

DESCRIPTION OF THE BACKGROUND ART

Systems that are used to show information in the form of advertisements, timetable messages or arrival and departure times in present-day public service infrastructures with regard to buses, trains, subway traffic, etc., is of a static nature. Such information is given on notice boards, posters, charts, tables, verbally through loudspeakers, and on digital displays, etc. A characteristic feature of such information media is that the information media is not coordinated, but is in the form of individual items which are controlled and updated separately, often manually.

Modern digital displays used, e.g., in conjunction with subway railway traffic gives some of the aforesaid information but is not controlled to display advertisements, warning messages, etc. Furthermore, the information is often supplemented with verbal messages transmitted from traffic control centers. The information channel cannot be subscribed to directly for the display of external information suppliers, such as advertising bureaux, the authorities, newspapers, etc., but is processed administratively and fed manually into the information display systems.

Although the administration of information is often processed manually with the aid of modern computer technology, the available display time will nevertheless contain "dead time", among other things due to back-logging caused by the manual infeed process.

Thus, present-day systems do not enable information to be updated dynamically for display in real time. Neither do present-day systems enable external mediators to update information for display in a central control system, nor yet the administrator who makes the display of information available, but that it is the administrator who determines when, where and how the information shall be displayed.

The present-day static information display systems are therefore beset with a number of problems.

Also known to the art are systems for displaying or showing picture series in local public places, such as assembly halls, lecture halls, and conference rooms in industry. The systems comprise diapositive television set or cameras which are controlled to display pictures, images and sound in an attractive manner, often with rapid picture changes and overlaps, so as to avoid the risk of boring viewers, as with conventional display with diapositive television set or cameras. The computer control of such systems may well be both complicated and advanced.

Unfortunately, these systems are nevertheless static insofar as they are used in one and the same locality and controlled and managed on the display site. The display must be planned carefully beforehand, this planning often being carried out by experts within the technical field in question, so as to obtain a finished display product. For instance, when a company wishes to change its display and introduce a new picture series combined with sound, the process again becomes static by virtue of the need to employ experts to program and arrange the new display.

The same problem as that mentioned above is also met when showing pictures through diapositive television set or cameras in one and the same locality, because the display subscriber has very little chance of influencing the display, especially in real time. The picture display is directed towards a limited public and towards scheduled display of one and the same information material to the public concerned. The picture display is not directed to a large number of people, as in the case of a railway station platform, a subway platform or in airports. In places of this nature, it should be possible to spread the information and to display different information in different places within said stations and it should be possible to update and change the information quickly. When the information displayed on said stations is not effectively coordinated, the displays on which information is presented will often become static, for instance show the time of the next display or show a pause picture, i.e. dead time. This becomes nerve-wracking to travelers, who often wait for long periods in waiting halls or stand on platforms. Neither is the failure to utilize expensive information display equipment to the highest possible degree compatible with good economy.

Further, It is a known problem when new films or movies are to be released at different locations such as cinemas that there are pirate copies made when the movies or films are distributed to the locations where they are going to be displayed to the public.

Still further, the advertisement sent at cinemas during the projection of a film is static, i.e. not instantly changeable.

Also, for advertisement on television the same drawbacks as for other systems are valid e.g. concerning changing of advertisement spots.

Yet further, the new standards for digital television will in a near future revolutionary television viewers demands on available services, such as pay per view, video on demand, interactive viewing etc, not to say what would be the case if it is combined with satellite transmission or cable carried broadband transmission.

SUMMARY OF THE INVENTION

The present invention aims to provide a flexible system in which external information mediators are able to dynamically control in real time the transmission of display instructions to a larger public in different places situated at any chosen distance apart through television sets or cameras which project information onto displays intended herefor.

An achievement of the invention is to allow video on demand and pay per view on television sets and other medium intended for display of information.

Another achievement is to make it possible to distribute, for example, movie films to cinema locations from a remote central place.

Yet another achievement of the invention is to enable pictures, images, messages and announcements to be configured in accordance with modern digital technology, therewith providing rapid communication.

A further achievement of the invention is to enable a picture, image or other information to be changed in practice as often as is desired, in real time, therewith providing direct and immediate communication, and to enable similar or specific information to be displayed in places that are mutually far apart and to enable message information to be alternated with advertising spots, for instance.

A still further achievement in part of the invention is to assign every television set and camera an address. In one embodiment a network address such as an Internet TCP/IP address.

According to one aspect, the present invention relates to a method of coordinating and controlling television sets or cameras in a digital information system for exposing information on at least one display device through the medium of at least one television set or camera.

Said method comprising the following steps:

generating an exposure list comprising control instructions for coordinating and controlling television sets or cameras with regard to what shall be exposed, when it shall be exposed, where it shall be exposed and for how long it shall be exposed;

using a control center for coordinating and controlling television sets or cameras, wherein the control center is able to create and update said exposure list in real time with control instruction fields via dynamic booking of information in time for exposure from mediators; and wherein the exposure list enables each television set or camera to be controlled, independently of other television sets or cameras, to receive the same or different information in accordance with the exposure list for exposure of respective television set or camera through the computerized devices.

Information mediators are, in one embodiment of the present invention, connected to a computerized control center via interfaces for data and telecommunication for round-the clock transmission of information. The control center has communication interfaces against computerized devices, situated at specific places remote from the control center, for coordinating and controlling television sets or cameras. A control center is able to create and update an exposure list in real time with control instruction fields via dynamic booking of information in time for exposure from mediators having drive routine means. Said drive routine means may be transparent for transmission of information with the drive routine means of the control center for transmission of information in the system via interfaces. The exposure list with control instructions coordinates and controls the television set or camera with regard to what shall be exposed, when it shall be exposed, where it shall be exposed and for how long it shall be exposed. Also it enables each television set or camera to be controlled, independently of other television sets or cameras, to receive the same or different information in accordance with the exposure list for exposure of respective television set or camera through the computerized devices.

In one embodiment, the system administrator is able to update the exposure list with elective information at any time whatsoever, wherein the dynamic booking can be changed or delayed.

In another embodiment a server situated at said specific place and included in a computerized device includes databases; and in that information in the databases relating to exposures in the exposure list is copied in databases of servers in a selected number of computerized devices situated at some other place.

A further embodiment comprises that the exposure list includes reserved instruction fields for updating control instructions via mediator interfaces.

A still further embodiment includes that the control instructions are placed in a queue, or line, when the exposure list temporarily lacks instruction updating fields.

In yet another embodiment a switch senses when one of said servers is out of function, wherein the television set or cameras controlled by said server are controlled by another server situated at some other place.

Also, a further embodiment ensures that every television set or camera is assigned an unique address, whereby the addresses can be of the type TCP/IP. Addresses to television set or cameras, in one embodiment, respectively, are stored on a smart card which can be read by computerised means via in these comprised smart card readers.

The present invention also relates to an arrangement of apparatus for carrying out the aforesaid method, said apparatus including the aforesaid devices and an exposure handler which creates the exposure list. More specifically an arrangement for coordinating and controlling television sets or cameras in a digital information system for displaying information on at least one display device through the medium of at least one television set or camera, said information being supplied by mediators of information, for exposure or display.

It comprises:

computerized control center means, wherein the control center has communication interfaces against;

computerized means for coordinating and controlling television sets or cameras;

exposure handler means whereby the control center functions, in real time and through the medium of said exposure handler, to create and update an exposure list having control instruction fields, via dynamic booking of display information from mediators; and wherein said exposure list, containing control instructions, coordinates and controls the television sets or cameras in question with respect to what shall be exposed, where it shall be exposed, when it shall be exposed, and for how long it shall be exposed, and enables each television set or camera, independently of other television sets or cameras, to receive the same or different information according to the exposure list for exposure, or display, by respective television set or camera through the computerized devices.

Mediators of information for exposure or display are connected to a computerized control center via interfaces for data and telecommunication for transmitting the information at any elected time whatsoever, wherein the control center has communication interfaces against computerized devices for coordinating and controlling television sets or cameras. The control center functions, in real time and through the medium of said exposure handler, to create and update an exposure list having control instruction fields via dynamic booking of display information from mediators having drive routine means. Said drive routine means possibly being transparent for transmission of information with the drive routine means of the control center for transmission of information in the system via interfaces. An exposure list containing control instructions coordinates and controls the television sets or cameras in question with respect to what shall be exposed, where it shall be exposed, when it shall be exposed, and for how long it shall be exposed. This enables that each television set or camera, independently of other television sets or cameras, to receive the same or different information according to the exposure list for exposure, or display, by respective television set or camera through the computerized devices.

BRIEF DESCRIPTION OF THE DRAWINGS

The following description makes reference to the text in the accompanying drawing to provide a better understanding of the embodiments of the present invention, said drawing illustrating schematically a system for coordinating and controlling television sets or cameras in a digital information system for displaying information in accordance with the invention.

DETAILED DESCRIPTION OF PREFERRED EMBODIMENTS OF THE INVENTION

The present invention relates to a method for the dynamic coordination and control of television sets or cameras, with possible peripheral equipment, in a digital information system for displaying information on at least one display device via at least one television set or camera for each display device, wherein the information is displayed in places that are accessible to and frequented by a general public. The invention also relates to an arrangement of apparatus for carrying out the method.

It is to be understood that the television set or camera itself can comprise a digital display device or be incorporated in a digital display device such as an LCD display, PDP display (Plasma Display Panel), a digital television set etc.

Although implementation of embodiments are limited in the following to private homes or cinema locations, it will be understood that the invention is not restricted to these embodiments. As before mentioned, the inventive system can be used in places where large sections of the public are known to visit or look at advertisement, looking at television, looking at movies etc., such as railway stations, subway stations, airports, outdoor locations, onboard aircrafts, onboard trains, onboard ships, airport waiting lounges etc, in addition to cinemas and private homes, and generally every were advertisements, films, movies and other information is displayed through the medium of television sets or cameras.

It should be appreciated that the word camera generally relates to any kind of apparatus able to project images on displays.

Preferred embodiments of the invention will now be described in detail with reference to the accompanying single drawing, which illustrates schematically a system 10 for coordinating and controlling television sets or cameras in a digital information system for displaying information on display devices, such as free-standing picture screens, wall-mounted screens, walls, and overhead screens or other means suitable for reproducing or exposing picture information in the form of text, stills, movable pictures, images, etc.

In the main, the system is comprised of a control center 12 having a communication interface 14 which connects an unlimited number of computerized devices 16, 18, 20 which are placed at desired distances from one another for the control of television sets 40 or cameras 22.

The illustrated system also includes an information mediator which is connected to the control center 12 through the medium of a computer 24 and a modem 26. Although only one modem is shown connected to the central computer 28 of the control center, it will be understood that modem poles, telephone switching centers and other similar devices may be used to this end in accordance with present-day techniques. Also, the connection between the system 10 or control center 12 and information mediators is arbitrary by wire or wireless, preferably cable oriented and possibly a broadband network.

As an example of a preferred embodiment, a system 10 could be administrated by almost any company or by a major broadcasting company for movies or television. Alternatively, the information mediators could be broadcasting companies and the administrator of the system 10 an independent distributor of media. In accordance, the computerized devices or station sites 16, 18, 20 are e.g. cable television delivers, satellite television distributors, locations where movies are displayed etc.

The central computer 28 in the control center 12 also includes databases 30, in the illustrated case two databases. The databases 30 may be externally connected to the central computer. The control center also includes working stations 32, which are preferably connected to the central computer 28 via a Local Area Network (LAN) in accordance with known techniques. The working stations 32 are used by the personnel serving the control center 12, in monitoring, checking, maintaining and updating functions in the central computer with its databases. The control center administrator is able to insert television set or camera control instructions via the working stations, for instance when information is directed specifically to travelers and passengers travelling by ship, train, subway, aircraft or some other vehicular traffic who require specific information. The information may concern the arrival times and departure times of passenger-carrying vehicles. The administrator controls internally how, what, when or where the information shall be displayed by the television sets or cameras 22. An important feature in this context, however, is that external information mediators 24 are able to give control instructions to the television sets or cameras 22 with regard to the information that the external mediators 24 desire the system 10 to display via the television set or cameras 22, each on its own initiative and communication-wise transparent via modems 26. This can be achieved in accordance with one embodiment of the invention without involving the working stations 32 in the procedure of transmitting the control instructions to the central computer 28.

The term information mediator 24 used in the following shall be interpreted in its widest meaning, i.e. as not only referring to advertising agencies but to all companies and private persons who wish to utilize the system 10 for commercial reasons or for the display of information that concerns a general public. At present a mediator which wishes to display information in public places is normally forced to wait about two weeks, perhaps longer, before his order can be implemented and the information publicly displayed. With the inventive digital information system 10, the information can be displayed principally in real time, i.e. at the time of making the order, possibly with a short delay due to processing, fully-booked exposure lists and other quickly passing causes. Furthermore, an external information mediator 24 is able to put through information to the system 12 twenty-four hours a day, whereupon the information can be included instantaneously in an exposure list, as illustrated in more detail below.

Those external information mediators which connect to the control center 12 are, in one embodiment of the invention, connected to the control center via specially designed interfaces (drive routine means) for data and telecommunication. In this way, only external mediators 24 having the correct interface are able to connect transparently to the control center 12 for delivering control instructions to the television sets or cameras 22, which avoids unauthorized access to the display of such information and misuse of the system. In this regard, the special interface, which may be included in the computers of external mediators, also includes commercially available code keys or other codes sent between the control center 12 and the computer 24 of the external mediator to verify the right to enter control instructions into the central computer 28, without the administrator needing to supply through the working stations 32 further information or authority permitting access of the external information mediators 24 to the central computer for transmitting system transparent control instructions to the television set or cameras 22.

In accordance with the invention, the control center 12 has a communication interface 14 against the computerized devices 16, 18, 20 situated on shifting positions or places for television set or camera coordination and control.

The drawing shows specifically a radio link which forms an interface between the control center 12 and the computerized devices 16, 18, 20, this interface being a preferred inter face, although not necessarily the sole possible interface. Other interfaces for transmitting information between the control center 12 and the computerized devices 16, 18, 20 may consist of a cable-carried ISDN solution (Integrated Services Digital Network), satellite network, other wireless network, or other fixed lines that have the same capacity.

In one embodiment of the invention relating to a cinema or a cable television distributor 1 (from now on cinema 1), the computerized device 16 is comprised of a cinema computer (server) which either includes or is connected externally to a hard disk 36, wherein the cinema computer 34 is connected to a plurality of television set or camera computers 38, three such television set or camera computers in the illustrated case, which transmit control information to connected television sets 40 or cameras 22, only one of which is shown. The television set or camera computers 38 have the form of PC units with picture screens in the illustrated case. The information sent to television sets or cameras 22 can be monitored on the picture screens of the PC units 38 and edited by personnel stationed at different locations within a cinema 16, or from a central location. In the illustrated embodiment, cinema 2, referenced 18, and cinema 3, referenced 20, comprise other cinemas that are equipped with devices similar to the devices of the cinema 16, although without showing the television set or camera computers 38 and the television set 40 or camera 22. It is assumed, however, that these stations also include television set or camera computers 38 and at least one television set or camera 22.

In an alternative embodiment of the device or devices 38, i.e. the television set or camera computers 38, included in the cinema computer 34, the television sets or cameras 22 is/are controlled directly from the cinema computer 34.

In yet another embodiment of the devices included in the computerized devices 16, 18, 20, the television set or camera 22 is replaced with an electronic display (not shown), such as a large picture screen in LCD technology, PDP technology or the like. The cinema computer 34 is then included in the large picture screen or is connected externally thereto. Preferably, the television set or camera computers 38 in the cinema computer 34 and the database 36 are also included. Information is transmitted from the control center 12 generally in the same manner as that before described. However, each separate large picture screen may be addressed directly through a radio network 14, wherein the screens are controlled from the control center 12 which includes redundancy. Thus, in the illustrated case, the computerized devices 16, 18, 20 form an electronic display with cinema control computer 34, said television set or camera 22 effecting the display.

According to one embodiment, the computerized devices 16, 18, 20 may include redundancy by virtue of all databases 36 or hard disks in the cinemas 16, 18, 20 including the same television set or camera control information or instructions for monitoring the system in a cinema 16, 18, 20. Thus, all information is copied between the cinema computers 34 and their databases 36 via the communications interface 14 from the central computer 28. This means that a computerized device for displaying information in a cinema via television sets or cameras 22 will not be disabled should one or two of the cinemas shown in the drawing suffer a computer or hard disk power down in a cinema computer 34. In the event of a power down in a cinema computer 34, the communications interface 14 can be coupled to a switch which automatically bypasses the cinema computer and connects television sets or cameras 22 connected to the power down computer 34 to one of the cinema computers 34 that is still in function (the switch is not shown in the drawing).

The digital information system 10 has been described in the aforegoing with regard to respective hardware and interfaces. Implementation of the present invention in achieving the objects and purposes thereof will now be described more specifically.

The illustrated central computer 28 is divided into three powerful servers 1, 2, 3, of which server 1 receives material from external information mediators 24, via modems 26, wire or wireless or combinations of them. Server 2 sends information material to the cinema computers 34. The same material can be sent to all cinema computers 34, even though the information is to be displayed solely on a given display or on given displays. What shall be exposed and where it shall be exposed will be explained in more detail below.

Server 3 functions to process information and control instructions received from the information mediator 24, as described in more detail below.

The server 3 of the central computer 28 functions partly as an exposure handler. The exposure handler 3 carries out the important object of the invention with regard to the possibility of an external mediator 24 to organize the information delivered to the cinema 16, 18, 20 via an exposure list, this organizing of information being effected in real time via the modem 26 and the server 1 that receives television set or camera control information from the external mediator.

In one embodiment of the invention, a queue, or line, is created from the information material received by the server 1, in accordance with some known line or queuing method, such as FIFO (First In First Out), LIFO (Last In First Out) or Round Robin, etc., wherein the server 3 or exposure handler 3 has set-up or created an exposure list which covers a twenty-four hour period for information exposure or display via television set or cameras 22. The exposure handler 3 collects and processes, i.e. allocates, information relating to television set or camera control instructions, wherein mediator information is sorted into the exposure list in accordance with the wishes of the mediator 24 or its instructions, when available space is found in the exposure list or in alternative places in the exposure list given by the mediator. If the exposure list is completely filled with instructions, the mediator instructions to the control center remain in the queue list in the server 1 in readiness for later inclusion in the exposure list, in accordance with a preferred embodiment.

In one embodiment of the invention, the exposure handler 3 creates or allocates a data message (data field) including a header, a control character field, an address field, optionally at least one CRC field (Cyclic Redundancy Code), and optionally status flags which identify and are connected to the information from an information mediator 24 and filed in the exposure list in the time interval that the information shall be exposed or displayed through a television set 40 or camera 22. This constitutes an alternative to the insertion of the entire information bit from an external mediator 24 in a specific time interval in the exposure list, and enables the provision of an exposure list that contains much less information and which is thus easier to handle, and to accelerate transmission of the list between computers and databases included in the system.

A data message in the exposure list can be understood here as being a control instruction in an instruction field for activating television set or cameras 22 to project information.

A data message of this kind connected to each individual information exposure enables known HASH or switching methods to find information included in the exposure time intervals in the exposure list both effectively and quickly. A First Classy server can be used conveniently for communications transmission between external information mediators 24 and the control center 12. Each external information mediator is then able to send an e-mail with included information material in any chosen format, which provides the advantage of not needing to write in any new software for the communication transmission function. As before mentioned, the system also incorporates a safety aspect, whereby each external information mediator that has an office or who subscribes to the system must possess a coded drive means or a coded drive routine in order to connect to the control center 12.

In order for external information mediators 24 to be able to deliver complete pictures/films, the mediator will preferably have its own versions of the software that the exposure handler 3 uses for enabling pictures/films to be introduced transparently into the exposure list without processing via the working stations 32 in the control center 12.

In one embodiment of the invention, there is thus included an alternative to the dynamic updating of the exposure list as mentioned in the aforegoing, i.e. the external information mediators 24 which do not have access to software in the exposure handler are provided with the possibility of having their picture material or exposure material processed by personnel serving the working stations 32, wherein said personnel enter, via the working stations 32, the information that the external mediator 24 wishes to have exposed, or displayed, via television set or camera control instructions in the exposure handler and via the exposure list created by the handler. Personnel at the working stations 32 are thus able to interrupt any queue lists in the server 1 to update the exposure list, via the exposure handler, with information generated centrally from the control center 12 or with information that is insufficiently processed when received by the server 1 from the external information mediator 24.

In accordance with the aforegoing, external information mediators 24 that have access to the exposure program are able to deliver complete picture series/films which can be processed automatically and inserted into the exposure list, or optionally personnel administering the working stations 32 are able to pick external mediator information from the queues, or lines, and process this information so that it can be inserted into the exposure list via the exposure handler 3. In order to be able to distinguish information that must be processed via the working stations, external mediators 24 can mark or label such transmitted material with an appropriate code, so that the central computer 28 is able to identify this material and send it to working stations 32 for processing. Alternatively, e-mail is processed and registered as information which must be processed.

Pictures are transmitted to displays or to exposure means digitally via a specially designed computer program.

All television sets or cameras 22 are able to show individual pictures or a collective picture via all television sets or cameras 22 simultaneously.

When the information mediator 24 is an advertising agency and the advertisements are to be displayed are in picture form, the advertising subscriber is able to buy a number of spots which are shown in the exposure list. The spots are shown, e.g., for a ten-second period, where, e.g., each sixth spot is a spot used by the operator of the cinema, wherein this spot can be used partly for advertising purposes and partly for information purposes. The advertising subscriber may buy spots individually or in a special package, and the digital information system is able to insert a change at short notice or to operate a completely new spot. The system is thus highly flexible and enables quick changes to be made with regard to what shall be exposed on the exposure means, where it shall be exposed and when.

Computer-produced pictures or exposures are delivered by external advertising agencies/newspaper agencies, etc., for exposure, or showing, in subways for instance. The pictures are received by a control center 12, which includes information material storage media. The control center also decides what shall be exposed and in which order, and distributes the information material to the cinema 16, 18, 20. The control center 12 is also able to refrain from displaying information which conflicts with "good order" or accepted morale and of a disturbing nature to the large majority of the public, possibly through the medium of working stations 32 and via control routines. The display of such information can also be prevented through the medium of the contracts signed by external information mediators 24 when obtaining an account or a subscription.

The exposures are received on respective cinemas by a cinema computer 34 (cinema server), wherein each television set or camera 22 has an individual television set or camera computer 38 which controls and feeds pictures to the television set or camera or television set or cameras 22. Television set or camera computers 38 are controlled by the cinema computer 34. The communications interface 26 between advertising agencies and the control center 12 is comprised of a communications modem 26, modem poles, switching centers, etc. According to one embodiment of the invention, the interface between the control center 12 and the cinema 16, 18, 20 is comprised of a radio transmitter with receiver.

Each means for exposing, or showing, information sent from the television sets or cameras 22 can be individually controlled. The control center 12 sends picture packets/information to the cinema computer 34 together with an exposure list. The exposure list includes a series of instructions as to what shall be shown, where it shall be shown, when it shall be shown and for how long, etc. The cinema computer 34 then provides each television set or camera computer 38 with the material to be exposed. Thus, one and the same information material can be shown on all screens, or certain screens can be chosen for specific information display. This facility is controlled via the exposure list or, when the need is acute, directly from the control center 12.

In addition to exposing pictures in different standard formats, for instance in PICT (Picture Format), EPS (Encapsulated Post Script), TIFF (Tagged Image File Format), etc., the digital information system is also able to expose Quick Times film, video film and transmit sound.

In one embodiment of the invention, the resolution is 1048×680 dpi, which constitutes a standard with advertising agencies for still pictures and picture sequences. The system is also able to display video film, which can now be recorded directly into a Macintosh® having a PCMCIA card (Personal Computer Memory Card International Association card). With regard to sound via a CD or some other source, the CD quality in stereo applies, 44 kHz. The television set or camera computer 38 informs the cinema computer 34 of the television set or camera address, picture number/name, exposure duration and the time of the exposure, through the medium of function control means in said cinema computer. In the event of a malfunction/mains failure or a power cut, the cinema computer 34 reports this occurrence to the control center 12. The central computer 28, in turn, monitors the cinema computers 34 at regular intervals.

The information material to be exposed, or shown, is down-loaded from the control center 12 to the cinema computers 34. Because each television set or camera 22 has its own computer 34, information material can be sent to the cinema computer 34 at any time in a calendar day without disturbing exposure on the cinema 16, 18, 20. When necessary, the exposure list can be changed or stopped in respect of all television set or cameras 22 or in respect of certain television set or cameras for showing specifically chosen information.

The computers 34 include counters which function to register, e.g. in tables or other registers, the length of time over which the information concerning each external information mediator 24 has been exposed, or shown. Thus, when so considered by an administrator, the mediator 24 need only pay for the actual time over which the information was displayed and is not required to pay a single down payment for, e.g., round-the-clock display over a seven-day period, as is at present the case.

According to one embodiment of the invention, the hardware is comprised of a number of powerful servers which form a central computer 28, said computer 28 and servers 1, 2, 3 essentially carrying out the following procedures. The server 1 receives material from the advertising agencies, via modems, for instance and the server 1 sends information material to the cinema computers 34, wherein the same information material can be sent to all cinemas even when the information shall be shown solely on a given screen or screens. The information to be displayed is determined by the exposure list sent to the cinema 16, 18, 20 with the exposure or picture material, which is effected via the server 2.

The exposure material or picture material (and other information), the exposure list, etc., are prepared in the exposure handler which is included in the server 3 in accordance with the aforegoing.

Each server 1, 2, 3 will preferably have its own array of databases 30, for instance external hard disks with sufficient storage capacity. All material is copied therebetween. This will result in redundancy, since each exposure or picture will occur in at least three copies. Copying between the databases 30, 36 can be effected automatically, with each newly arrived or changed file containing information being copied in the remaining databases.

The information material is received by respective cinemas 16, 18, 20 in a cinema computer 34 (server). The cinema computer 34 feeds exposures or pictures to the television set or camera computers 38 in accordance with the exposure list.

In summary, the following hardware is required in the illustrated embodiment; three central servers 1, 2, 3 plus large databases 30, for instance three hard disks each of 27 GB. The server 1 is connected to the information mediators via modems, wherein a First Class® server is recommended with regard to promoting user-friendliness.

A number of working machines or working stations 32 are connected to the central computer 28 for controlling, communicating and processing of exposure or picture material, generating exposure lists through the exposure handler when required, and so on. Alternatively, the information mediators 24 may have their own versions of the exposure program used, thereby enabling the mediators to deliver finished picture sequences/films transparently. These picture sequences/films need not then be prepared in the control center 12, but can be filed dynamically in the exposure list by the exposure handler.

The illustrated embodiment also includes a radio system which includes a transmitter and a receiver for each cinema 16, 18, 20, wherein at least two channels will preferably be made available, one channel for transporting exposure or picture material and one channel for communication with the control center 12. This obviates the need of interrupting picture transmission from the control center 12 in order, e.g., to enter emergency messages or for entering check reports from the cinema computers 34.

The cinema computers 34 are responsible for communication with the control center 12 and supply the project computers 38 with information material or exposure material and handle control routines in the cinemas 16, 18, 20. The television set or camera computers 38 deliver pictures to the television set or cameras 22 and monitor the function of the television set or cameras. In this case, the exposure information for the pictures can be fed from the cinema computer 34 in packets. When a packet has been exposed, it is erased to make room for the next packet. Alternatively, there can be used a computer 34 that has sufficient capacity to store all pictures that are to be exposed. This assumes, however, that the entire picture stock shall be fed out in sequence.

Starting from the presumption that a picture or exposure may not be larger than 10 MB and that ten percent of the material is updated daily, there would be required a communication system that can handle transmission speeds of at least 1.75 MB/minute. Although a cable-carried solution such as ISDN, which in a four-channel version manages two MB/minute, or fixed lines of the same capacity as an alternative to radio transmissions, such systems are at the moment enormously expensive to run, since the channels must be open all day round, meaning that at present radio transmission is a cost-effective method with regard to the communications interface 14.

The transmission rate of present digital information systems corresponds to 100 Mbits/s, in parity with new Ethernet® solutions. This is preferred for the inventive solution, and a ready developed Ethernet® solution can be used on the cinemas 16, 18, 20 between the cinema computer 34 and the television set or camera computers 38.

One assumption in this regard is that all computers 32, 38 are able to handle PCI Ethernet® cards (Personal Computer Interface), which is the case with all new Power Macintosh®. 100 Mbits Ethernet® assumes ideal conditions with minimum disturbing or interfering magnetic fields, optimal cables, no abrupt swings with the cables, etc. Such factors seriously disturb and reduce the transmission rate. Despite these obstacles, the actual brake block is the own central SCSI bus (Small Computer System Interface) of the television set or camera computer 38 to which the television set or camera 22 should be connected. The transmission maximum of present-day SCSI busses is about 5–7 MB/s. This means that two seconds are required to move a picture or exposure of 10 MB from the cinema computer 34 to the television set or camera computer 22.

The fastest Macintosh® servers at present manage clock frequencies, with accelerator cards, of about 160 MHz. This is sufficient to divide up a Quick Time® film or video film in real time, for instance. The computers also have a built-in stereo, 44 kHz, which produces sound of CD-quality. Naturally, CD rom and Audio CD and, e.g., Kodak® photo CD can be used in the system. On the basis that pictures or exposures have, on average, a size of 10 MB, 2500 exposures will require 25 GB storage media. External disks can be used to this end, for instance. This large storage capacity is primarily only required for the control center 12. The cinema computer 34 may have a smaller storage capacity and is supplied with fresh material during the day. This latter is effected by virtue of the function control reporting to the control center 12 when a picture has been shown, the nature of the picture, where the picture was shown and for how long. The picture is then erased. When fewer picture remain, the control center 12 automatically sends the next picture or exposure packet. This method enables the television set or camera computer 22 to work effectively with a still smaller storage capacity. On the other hand, the television set or camera 22 is equipped with a buffer memory for at least two pictures or exposures. When a picture or exposure has been shown, the picture or exposure is scrapped and leaves room for the next picture, this picture being sent from the cinema computer 24 during the time that picture number 2 is exposed. This avoids a two-second delay that would otherwise occur in transmission, in which case the screen would be blank or switched off during this time period.

Present-day Power Macintosh® servers manage these requirements. However, the development of server performance is advancing at great speed, and it is therefore to be expected that servers having still better performances will be available within a year.

Alternative servers 1, 2, 3 are SUN® servers or an Alpha® from Digital®. Although these servers operate under UNIX® and Windows® respectively, this does not affect the users, who are able to work under MAC OS®. A further important resource for the future is the Apple® system Copland® which is expected to be made commercially available this year. The most important advantages consist in multitasking and open transport. For instance, multitasking permits copying to several different servers at the same time as another program is processed. Consequently, when the server is sufficiently powerful, only from one to two servers is required in the control center 12, instead of three servers 1, 2, 3 as is now the case. Furthermore, a server is able to serve the exposure means, screens, cloths, wall surfaces of an entire cinema, and the television set or camera computers 38 can therewith be omitted, this being included in an alternative embodiment of the present invention as before mentioned. Open Transport permits communication via modems with several users connected to the same computer.

For achieving a purposeful digital information system according to the present invention, there is used to this end specifically developed software, which will not be described in more detail here.

There are available at present programs such as Powerpoint® and similar programs, which will not function effectively for three reasons. The programs are very large and load the computers unnecessarily. These programs also contain a large amount of resources that are not required to show pictures or exposures. For instance, advertising exposure also differs greatly from picture or exposure presentations of the Powerpoint® type. Powerpoint® thus lack resources that advertising agencies may wish to use. Primarily morphing, which is used progressively more often in advertising programs, for instance in television broadcasting. Morphing is a process in which the image of one object is smoothly changed into that of another object, for instance human beings to animals and/or vice versa. It must be possible to present the picture sequences to be shown in a manner more interesting than solely a diapositive presentation, this being one of the objects achieved with the invention. This touches on the border region between still pictures, moving pictures and film where the methods overlap one another. It is also probable that external mediators 24 of picture or exposure presentations will use sound. It is therefore wiser to write specific software which includes those resources that external mediators 24 desire, i.e. cultivate software. It will also be easier to update an own developed program with own resources at a future date.

In this way, the external mediators 24 do not need to bind themselves to the use of the Powerpoint® format. They simply deliver pictures in desired formats.

In order to achieve the inventive digital information system, it is necessary to provide a number of drive routine means, such as communication drive routine means for transferring information between external mediators 24 and the control center 12, copying means for copying to the various databases 30, 36, drive routine means for composing the picture or exposure material to be shown, exposure handlers, drive routine means for a radio network, control means in the cinema computer 34 which feed pictures or exposures to the television set or camera computers 38 in accordance with the exposure list, function control means in the television set or camera computers 38 and in the cinema computers, and drive routine means for television set or cameras 22. Effective programs exist for copying between the different databases, for instance Retrospect®.

In yet another embodiment of the present invention, the central computer 28 comprises a relation database and/or, for example, a video server of the type Oracle® which is able to optimally manage pictures and films. The central computer 28 is connected 14 to network computers 34, 38 which control each one television set or camera 22. Every television set or camera 22 or network computer 34, 38 has a TCP/IP address Transmission Control Protocol/Internet Protocol) and are able to be addressed by the central computer 28 and vice versa.

TCP/IP is a transmission and Internet protocol which de facto is a network standard. It is commonly used in connection with X.25 and Ethernet® connections and is regarded as one of few protocols which provide a true connection to OSI (Open Systems Interconnection).

The TCP/IP address allows addressing of unique output data such as pictures to every television set or camera 22, respectively.

With the existing Oracle® relation database the comprised accounting or statistic software for invoicing of purchased advertising time can be used.

A relation database is a type of database system where all the data is stored together with indications of specific connections (relations) between stored information which simplifies searching, printing, sorting etc. in the database 30 or outputs from it.

The basis of the system is comprised by the relation database 30. In the database 30 pictures are stored which are to be displayed or otherwise used. A control system provides a master unit to the database 30 which controls displaying of pictures to the concerned television set or cameras 30 in the network 10.

In order to be able to achieve that every object, for example, information displayed by television sets or cameras 22, that is used is possible to address, every television set or camera is in need of an unique address, for example, a TCP/IP number. This accomplishes that every object can be individually addressed. Additionally, television sets or cameras 22 are connected to a control computer 34, 38. Here, it is possible to use, for example a network computer (NC) as control computer 34.

Every NC may comprise or include a so called smart card reader. On smart cards addresses are stored to television sets or cameras 22, respectively. It is of course possible to group the addresses in order to generate series of objects as information with or without pictures, i.e. the same information to a lot of addresses.

Further, the present invention may comprise an interface to Internet for catching of information from Internet or storing and displaying in Internet.

It is a known problem when new films or movies are to be released at different locations such as cinemas that there are pirate copies made when the movies or films are distributed to the locations where they are going to be displayed to the public. The present invention is, i.a., used for distribution of newly released movies or films from the control center 12 to, for example, cinemas 16, 18, 20 thereby reducing the risk for pirate copying. Movies or films can be sent in a packed format from the control center 12 an unpacked at the cinemas 16, 18, 20, thus further minimizing the risk for pirate copying.

Another embodiment of the present invention provides that advertisement sent at cinemas during the projection of a movie or film is instantly changeable with the method and the arrangement according to the above description.

Hence, if a television viewer is a subscriber to use the system 10 as a mediator 24, the viewer will be able to use video on demand and pay per view on television sets and other medium intended for display of information. The sites 16, 18, 20 are thus for example serviced by a cable television supplier and the subscriber enters the exposure list with a time schedule for broadcasting to his television set or a demand for a specific movie at a preferred time.

Also, for advertisement on television the same problems and drawbacks as for other systems are valid e.g. concerning changing of advertisement spots. The present invention solves the problems concerning changing of advertisement spots in real time by, for example, letting the places 16, 18, 20 being situated at corporations broadcasting television. If it is a major broadcasting corporation, the control center 12 can be placed in the producers locations and the cinemas 16, 18, 20 each used for different television channels.

Alternatively, a television set or camera could be given a unique network address in the system according to the present invention. This accomplishes that every television-set can be individually addressed.

It will be understood that the aforedescribed embodiments of the present invention are not intended to limit the scope of the invention, but are merely intended as preferred modes of carrying out the invention. The invention includes other embodiments apparent to the person skilled in this art from the scope of the following Claims.

The invention claimed is:

1. A method of coordinating and controlling television sets or cameras in a digital information system for exposing information on at least one display device through the medium of at least one television set or camera, characterized in that it comprises the following steps:
   generating an exposure list comprising control instructions for coordinating and controlling television sets or cameras with regard to what shall be exposed, when it shall be exposed, where it shall be exposed and for how long it shall be exposed;
   using a control center for coordinating and controlling television sets or cameras, wherein the control center is able to create and update said exposure list in real time with control instruction fields via dynamic booking of information in time for exposure from mediators; and
   wherein the exposure list enables each television set or camera to be controlled, independently of other television sets or cameras, to receive the same or different information in accordance with the exposure list for exposure of respective television set or camera through the computerized devices.

2. A method according to claim 1, characterized in that information mediators are connected to a computerized control center via interfaces for data and telecommunication for round-the-clock transmission of information, wherein the control center has communication interfaces situated at specific places remote from the control center having drive routine means, which may be transparent for transmission of information with the drive routine means of the control center for transmission of information in the system via interfaces.

3. A method according to claim 2, characterized in that a system administrator is able to update the exposure list with elective information at any time whatsoever, wherein the dynamic booking can be changed or delayed.

4. A method according to claim 3, characterized in that a server comprises databases; and in that information in the databases relating to exposures in the exposure list is copied in databases of servers.

5. A method according to claim 4, characterized in that the exposure list includes reserved instruction fields for updating control instructions via mediator interfaces.

6. A method according to claim 5, characterized in that the control instructions are placed in a queue or line when the exposure list temporarily lacks instruction updating fields.

7. A method according to claim 6, characterized in that a switch senses when one of said servers is out of function, wherein the television sets or cameras controlled by said server are controlled by another server.

8. A method according claim 1, characterized in that every television set or camera is assigned a unique address.

9. A method according to claim 8, characterized in that the addresses are of the type TCP/IP.

10. A method according to claim 8, characterized in that the addresses to television sets or cameras, respectively, are stored on a smart card which can be read by computerized means.

11. An arrangement for coordinating and controlling television sets or cameras in a digital information system for displaying information on at least one display device through the medium of at least one television set or camera, said information being supplied by mediators of information, for exposure or display, characterized in that it comprises:
- computerized control center means, wherein the control center has communication interfaces against;
- computerized means for coordinating and controlling television sets or cameras;
- exposure handler means whereby the control center functions, in real time and through the medium of said exposure handler, to create and update an exposure list having control instruction fields, via dynamic booking of display information from mediators; and
- wherein said exposure list, containing control instructions, coordinates and controls the television sets or cameras in question with respect to what shall be exposed, where it shall be exposed, when it shall be exposed, and for how long it shall be exposed, and enables each television set or camera, independently of other television sets or cameras, to receive the same or different information according to the exposure list for exposure or display by respective television set or camera through the computerized devices.

12. An arrangement according to claim 11, characterized in that said mediators are connected to the control center means via interfaces for data and telecommunication for transmitting said information at any elected time whatsoever.

13. An arrangement according to claim 12, characterized in that said mediators posses drive routine means, said drive routine means possibly being transparent for transmission of information with the drive routine means of the control center for transmission of information in the system via interfaces for that purpose.

14. An arrangement according to claim 13, characterized in that the system administrator is able to update the exposure list with elective information at any time whatsoever, wherein the dynamic booking can be changed or delayed.

15. An arrangement according to claim 14, characterized in that a server situated at a specific place includes databases; and in that information in the databases relating to exposures in the exposure list is copied into databases of servers.

16. An arrangement according to claim 15, characterized in that the exposure list includes reserved instruction fields for updating with control instructions via the mediator interfaces.

17. An arrangement according to claim 14, characterized in that the control instructions are placed in a queue or line when the exposure list momentarily lacks instruction fields for updating instructions.

18. An arrangement according to claim 17, characterized by a switch which detects when a camera computer is non-functional, in which case those television sets or cameras that are controlled by the non-functional cinema computer are controlled by a cinema computer situated at some other place.

19. An arrangement according to claim 18, characterized in that every television set or camera is assigned a unique address.

20. An arrangement according to claim 19, characterized in that the addresses are of the type TCP/IP.

21. An arrangement according to claim 19, characterized in that the addresses to television sets or cameras, respectively, are stored on a smart card which can be read by computerized means.

22. A method of coordinating and controlling electronic displays in a digital information system for exposing information on at least one display device through the medium of at least one electronic display, characterized in that it comprises the following steps:
- generating an exposure list comprising control instructions for coordinating and controlling electronic displays with regard to what shall be exposed, when it shall be exposed, where it shall be exposed and for how long it shall be exposed;
- using a control center for coordinating and controlling electronic displays, wherein the control center is able to create and update said exposure list in real time with control instruction fields via dynamic booking of information in time for exposure from mediators; and
- wherein the exposure list enables each electronic display to be controlled, independently of other electronic displays, to receive the same or different information in accordance with the exposure list for exposure of respective electronic display.

23. A method according to claim 22, characterized in that information mediators are connected to a computerized control center via interfaces for data and telecommunication for round-the-clock transmission of information, wherein the control center has communication interfaces, situated at specific places remote from the control center having drive routine means, which may be transparent for transmission of information with the drive routine means of the control center for transmission of information in the system via interfaces.

24. A method according to claim 23, characterized in that a system administrator is able to update the exposure list with elective information at any time whatsoever, wherein the dynamic booking can be changed or delayed.

25. A method according to claim 24, characterized in that a server comprises databases; and in that information in the databases relating to exposures in the exposure list is copied in databases of servers.

26. A method according to claim 25, characterized in that the exposure list includes reserved instruction fields for updating control instructions via mediator interfaces.

27. A method according to claim 26, characterized in that the control instructions are placed in a queue or line, when the exposure list temporarily lacks instruction updating fields.

28. A method according to claim 27, characterized in that a switch senses when one of said servers is out of function, wherein the electronic displays controlled by said server are controlled by another server.

29. A method according to claim 22, characterized in that every electronic display is assigned a unique address.

30. A method according to claim 29, characterized in that the addresses are of the type TCP/IP.

31. A method according to claim 29, characterized in that the addresses to electronic displays are stored on a smart card which can be read by computerized.

32. An arrangement for coordinating and controlling electronic displays in a digital information system for displaying information on at least one display device through the medium of at least one electronic display, said information being supplied by mediators of information, for exposure or display, characterized in that it comprises:

computerized control center means, wherein the control center has communication interfaces against;

computerized means for coordinating and controlling electronic displays;

exposure handler means whereby the control center functions, in real time and through the medium of said exposure handler, to create and update an exposure list having control instruction fields, via dynamic booking of display information from mediators; and wherein said exposure list, containing control instructions, coordinates and controls the electronic displays in question with respect to what shall be exposed, where it shall be exposed, when it shall be exposed, and for how long it shall be exposed, and enables each electronic display independently of other electronic displays, to receive the same or different information according to the exposure list for exposure or display by respective electronic display.

33. An arrangement according to claim 32, characterized in that said mediators are connected to the control center means via interfaces for data and telecommunication for transmitting said information at any elected time whatsoever.

34. An arrangement according to claim 33, characterized in that said mediators posses drive routine means, said drive routine means possibly being transparent for transmission of information with the drive routine means of the control center for transmission of information in the system via interfaces for that purpose.

35. An arrangement according to claim 34, characterized in that the system administrator is able to update the exposure list with elective information at any time whatsoever, wherein the dynamic booking can be changed or delayed.

36. An arrangement according to claim 35, characterized in that a server situated at a specific place includes databases; and in that information in the databases relating to exposures in the exposure list is copied into databases of servers.

37. An arrangement according to claim 36, characterized in that the exposure list includes reserved instruction fields for updating with control instructions via the mediator interfaces.

38. An arrangement according to claim 35, characterized in that the control instructions are placed in a queue or line when the exposure list momentarily lacks instruction fields for updating instructions.

39. An arrangement according to claim 38, characterized by a switch which detects when an electronic display computer is non-functional, in which case those electronic displays that are controlled by the non-functional electronic display computer are controlled by an electronic display computer situated at some other place.

40. An arrangement according to claim 39, characterized in that electronic display is assigned a unique address.

41. An arrangement according to claim 40, characterized in that the addresses are of the type TCP/IP.

42. An arrangement according to claim 40, characterized in that the addresses to electronic displays are stored on a smart card which can be read by computerized means.

* * * * *